2,864,693

BRAZING ALLOYS

Arthur T. Cape, Los Angeles, Calif., and Charles V. Foerster, West Englewood, N. J., assignors to Coast Metals, Inc., Little Ferry, N. J., a corporation of Delaware No Drawing. Application April 24, 1956
Serial No. 580,179

4 Claims. (Cl. 75—125)

This invention relates generally to brazing alloys, but has reference more particularly to brazing alloys of the type which contain nickel as a base.

A primary object of the invention is to provide brazing alloys of this type which are especially adapted for use in so-called exothermic gas atmospheres, and for brazing by means of a torch.

Another object of the invention is to provide brazing alloys of this type, which, with slight modification, may also be used for brazing in reducing and neutral atmospheres.

A further object of the invention is to provide brazing alloys of this type which have excellent flow characteristics, and which produce joints of high strength, and devoid of brittle zones.

A still further object of the invention is to provide brazing alloys of this type which can be satisfactorily used over a wide range of brazing temperatures, i. e., from about 1650° F. to about 2100° F.

Other objects and advantages of the invention will become apparent in the course of the following description.

The brazing alloys, in accordance with the invention, will contain nickel in amounts of from about 35% to about 64.5%, iron in amounts of from about 25% to about 54.5%, and phosphorus in amounts of from about 8% to about 14%. However, alloys which contain only nickel, iron and phosphorus, within these ranges, tend to produce brittle joints, even though the flow characteristics of the alloy are excellent. This brittleness in the joint is often associated with brittleness in the base metals in the areas which are effected by the braze.

In order to overcome and prevent the formation of the hard brittle areas, without impairment of the flow characteristics, while increasing the strength of the joints, we add to the foregoing base alloy, one or more metals or elements selected from the group consisting of copper, cobalt, chromium, manganese, molybdenum and tungsten. Each of these elements may be used in an amount of from about 2.5% to about 10%, but the combined total of such elements used should not exceed about 25%. Lithium, in small amounts up to about ½%, may be added to increase the fluidity and wettability of the alloy.

Where the alloys are used for brazing in exothermic gas atmospheres, it is preferred that chromium, because of its tendency to become oxidized, should not be used, or that it be used in a very small amount. If the atmosphere in which the brazing is to be done is argon or dry hydrogen, then it is preferred that chromium be used to produce the desired joint strength, since it is less expensive than copper, molybdenum and tungsten, especially when used as ferro-chromium.

Small amounts of other elements may be present in a total amount not to exceed 5%. These include silicon, sulphur and carbon.

If neutral (argon) or reducing (dry hydrogen) atmospheres are employed for brazing, the temperatures employed will range from about 1650° F. to about 2100° F. Since temperatures in the range of 2000° F.–2100° F. are usually employed for copper brazing, this means that the alloys can be employed, in many instances, without reducing the normal working temperatures used in brazing operations.

In cases where exothermic atmospheres or atmospheres which are oxidizing to stainless steel are involved, the minimum brazing temperature should be about 1850° F.

Several preferred compositions falling within the ranges of alloys encompassing the invention are:

| | | |
|---|---|---|
| Nickel | 51 | 47.25 |
| Iron | 32.5 | 28.75 |
| Phosphorus | 11.5 | 11.5 |
| Copper | 5 | 5 |
| Cobalt | | 7.5 |
| | 100.0 | 100.00 |

It will be understood that various slight changes can be made in the alloys without departing from the spirit of the invention or the scope of the appended claims.

Having thus described our invention, we claim:

1. A brazing alloy having excellent flow characteristics and which produces joints of high strength, devoid of brittle zones, said alloy consisting essentially of nickel in amounts of from about 38% to about 64.5%, iron in amounts of from about 25% to about 54.5%, phosphorus in amounts of from about 8% to about 14%, and at least one element selected from the group consisting of copper, cobalt, chromium, manganese, molybdenum and tungsten, in an amount of from about 2.5% to about 10%, with the total such elements not exceeding about 25%.

2. A brazing alloy, as defined in claim 1, in which the alloy may include silicon, sulphur and carbon in a total amount not to exceed 5%.

3. A brazing alloy consisting of about 51% nickel, about 32.5% iron, about 11.5% phosphorus, and about 5% copper.

4. A brazing alloy consisting of about 47.25% nickel, about 28.75% iron, about 11.5% phosphorus, about 5% copper, and about 7.5% cobalt.

References Cited in the file of this patent

UNITED STATES PATENTS

| 2,159,805 | Lenz | May 23, 1939 |
| 2,194,982 | McCauley | Mar. 26, 1940 |
| 2,200,742 | Hardy | May 14, 1940 |
| 2,261,174 | McCauley | Nov. 4, 1941 |
| 2,762,706 | Cape | Sept. 11, 1956 |